US011662989B2

(12) United States Patent
Cui (10) Patent No.: US 11,662,989 B2
(45) Date of Patent: May 30, 2023

(54) POINTER ALIGNMENT COMPUTATION IN PROGRAM CODE ACCORDING TO CODE PATTERN ANALYSES

(71) Applicant: INTERNATIONAL BUSINESS MACHINES CORPORATION, Armonk, NY (US)

(72) Inventor: Shimin Cui, North York (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 135 days.

(21) Appl. No.: 17/304,223

(22) Filed: Jun. 16, 2021

(65) Prior Publication Data

US 2022/0405071 A1    Dec. 22, 2022

(51) Int. Cl.
*G06F 8/41*    (2018.01)

(52) U.S. Cl.
CPC .................... *G06F 8/4441* (2013.01)

(58) Field of Classification Search
CPC ... G06F 8/443; G06F 8/41; G06F 8/75; G06F 8/40; G06F 8/445; G06F 8/441; G06F 8/4441
See application file for complete search history.

(56) References Cited

U.S. PATENT DOCUMENTS

| 8,191,057 B2 | 4/2012 | Archambault et al. |
| 8,631,048 B1* | 1/2014 | Davis .................... G06F 16/211 |
| | | 707/803 |
| 2007/0130140 A1* | 6/2007 | Cytron .............. G06F 16/90344 |
| 2008/0052693 A1 | 2/2008 | Archambault et al. |
| 2010/0153654 A1 | 6/2010 | Vorbach et al. |
| 2017/0017472 A1 | 1/2017 | He et al. |

OTHER PUBLICATIONS

David J. Pearce "Efficient field-sensitive pointer analysis of C", Nov. 2007 ,ACM Transactions on Programming Languages and Systems, vol. 30 Issue 1 (Year: 2007).*

(Continued)

*Primary Examiner* — Wei Y Zhen
*Assistant Examiner* — Amir Soltanzadeh
(74) *Attorney, Agent, or Firm* — Griffiths & Seaton PLLC (57) ABSTRACT

Pointer alignment in a computer programming to obtain information enabling a compiler to optimize program code. Equivalence classes of pointers are collected in a program using a flow-insensitive yet field-sensitive pointer analysis operation iterating through an entire program code of the program. The equivalence classes of pointers, once collected, are mapped to and recorded in an equivalence class mapping table (ECTable). A portion of the collected equivalence classes of pointers are identified, from the ECTable, as pointer candidates for a pointer alignment computation according to a code pattern analysis of each pointer candidate. The code pattern analysis is based on available alignment information, and whether the alignment information would enable a compiler to optimize pointer references of the candidate pointer. The pointer alignment computation is then performed for each identified pointer candidate to obtain the alignment information used to optimize execution of the program.

18 Claims, 6 Drawing Sheets

(56) References Cited

OTHER PUBLICATIONS

Maryam Emami et al., "Context-Sensitive Interprocedural Points-to Analysis in the Presence of Function Pointers", ACM SIGPLAN Notices, Association for Computing Machinery (ACM), Jun. 1994, pp. 242-256.
Jakub Kuderski et al., "Unification-based Pointer Analysis without Oversharing", arXiv: 1906.01706, arXiv.org, Cornell University, Jun. 4, 2019, 10 pages.
Ivan Pryanishnikov et al., "Pointer Alignment for Processors with SIMD Instructions", In Proceedings of the 5th Workshop on Media and Streaming Processors, Technische Universität Wien, Austria, 2003, 8 pages.
Bjarne Steensgaard, "Points-to Analysis in Almost Linear Time", POPL '96: Proceedings of the 23rd ACM SIGPLAN-SIGACT Symposium on Principles of Programming Languages, Jan. 1996, pp. 32-41.

* cited by examiner

```
ComputerAlignment(pointer X)
    align = 0
    add X to worklist
    while (worklist is not empty) do
        pop the front of worklist as p
        if (alignment is known for p or p is visited already)
            continue
        if (p is a parameter pointer)
            for each call site to this function
                add the corresponding argument to the worklist
        else (p is an instruction) : case p in:
            p = malloc ...: (heap allocation)
                align = gcd(align, heap allocation alignment)
            p = alloca ...: (stack allocation)
                align = gcd(align, stack allocation alignment for p)
            p = f ...: (function call)
                add the return value in f to the worklist
            p = *Y: (load)
                add all mapped pointers of p in ESTable to worklist
            p = p0 + c1 * i + c2: (pointer arithmetic)
                add p0 to worklist
                align = gcd(align, c1, c2)
            p = (f)(p0, p1, ... pn): (value-preserving cast, phi, ...)
                add (p0, p1, ... pn) to worklist
            Otherwise:
                align = 1
        if (align is 1) return 1
    done while
    return align
```

FIG. 6

POINTER ALIGNMENT COMPUTATION IN PROGRAM CODE ACCORDING TO CODE PATTERN ANALYSES

BACKGROUND

The present invention relates in general to computing systems, and more particularly, to various embodiments for computing pointer alignment using a computing processor.

SUMMARY

According to an embodiment of the present invention, a computer-implemented method for computing alignment of pointers in programming is disclosed. The computer-implemented method includes, in response to collecting equivalence classes of pointers in a program using a flow-insensitive and field-sensitive unification-based pointer analysis, recording the equivalence classes of pointers in an equivalence class mapping table (ECTable). The computer-implemented method performs a code pattern analysis of pointer references in the program to identify, according to predefined criteria, a set of pointer candidates from the ECTable for an alignment computation. The computer-implemented method further performs the alignment computation on each of the set of pointer candidates by iterating through a use-definition chain of each identified candidate pointer commencing with a respective reference point of each identified candidate pointer. The computer-implemented method further receives alignment information as a result of the alignment computation and provides the alignment information to a compiler.

An embodiment of the present invention includes a computer system. The computer system includes a processor, a memory, a storage device, and program instructions stored on the storage device for execution by the processor via the memory. The program instructions, when executed by the processor, cause the processor to perform similar functionality as summarily described.

An embodiment of the present invention includes a computer-usable program product. The computer-usable program product includes a computer-readable storage device, and program instructions stored on the storage device. The program instructions, when executed by the processor, cause the processor to perform similar functionality as summarily described.

DETAILED DESCRIPTION OF THE DRAWINGS

Data processing systems provide mechanisms that dynamically check memory access alignment. Memory accesses may be unconstrained such that any individual byte within the memory may be addressed by any sized memory access, or the memory accesses may be constrained such that only memory accesses aligned with, for example, half-word, word, double-word, etc. boundaries may be made. Thus performing an alignment of data in memory (or computing/determining the alignment of the data) generally refers to various techniques that are associated with the way the data is stored across memory banks, which is dependent upon the boundary size of the data and/or data type to comply with requisite data alignment requirements of programming languages and/or as mandated by processor architecture.

In programming, pointers are used extensively in pointer-rich programming languages, such as C and C++, and these pointers are also aligned generally referencing that the address being pointed to is evenly divisible by some factor (i.e., constrained to, for example, a word boundary for access). This alignment information of pointers is useful in a variety of compiler-controlled optimizations leading to performance improvements for the program. For example, if an alignment analysis can show that a program pointer is aligned for access by a loop where single instruction, multiple data (SIMD) instructions would be appropriate, the code duplication to work around otherwise unknown pointer alignment (such as the inclusion of loop versioning with dynamic alignment checking) can be avoided. Users may also add code in the program to check pointer alignment to perform similar tasks but differently for different data types. For example, in spec_qsort routine, which is used in SPEC CPU®2017 benchmarks including mcf, gcc, cam4, and povray, alignment is checked each time a pair of elements of the data to be sorted is swapped. These dynamic alignment checks can be removed in the benchmarks were valid alignment information obtained for those data pointers, which would, of course, significantly improve benchmark performance. Removing these dynamic alignment checks would also facilitate efficient use of other optimization mechanisms and analyses on the data, as resources could be diverted to more preferable operations rather than necessarily using those resources to recursively confirm alignment.

It should be noted that the known techniques in the art of pointer analysis are distinct from (i.e., a precursor to) computing pointer alignment analysis, notwithstanding pointer alignment analysis methods are very similar to pointer analysis methods. The intra- and inter-procedural pointer analysis has been studied in depth for many years with several proposed methods. As known in the art, different methods of analyses provide different trade-offs between accuracy and efficiency (e.g., flow-sensitive analyses such as sparse analysis as compared to flow-insensitive analyses such as Steensgaard's or Anderson's). In a flow-sensitive analysis, different points-to information is computed for each program point, whereas for a flow-insensitive analysis, points-to information is merged across all program points. Of course, flow-sensitive analyses are more accurate, but less scalable (i.e., they require more resources to operate and are therefore resource 'expensive') than flow-insensitive analyses. The inter-procedural flow-sensitive pointer analyses compute information for pointers at every point in the program, propagate the information in each procedure, and then perform iterative closures on the collected information for all the procedures. However, such analyses are extremely resource intensive, particularly in compilers that deal with relatively large programs.

When considering the alternative intra-procedural methods, the granularity or accuracy as opposed to the methods' efficiency can further be considered. For example, in an inclusion-based analysis (e.g., Anderson's), a pointer can point to a set of abstract locations, and two pointers may be aliases if they both can point to some abstract location. In a unification-based analysis (e.g., Steensgaard's), pointers are placed into equivalence classes. That is, if pointer p can point to something that pointer q can, they are considered to be in the same equivalence class.

So far, the most efficient inter-procedural pointer analyses are flow-insensitive context-insensitive unification-based Steensgaard-style methods, which as aforementioned, can be used to compute equivalence classes of pointers in the whole program. Translating this type of analysis to pointer alignment analyses is, in general, less precise than the more complex and more expensive flow-sensitive analyses, but may provide more accurate alignment information for pointers of multiple indirect levels.

Accordingly, in this invention, techniques to compute the pointer alignment based on the collected equivalence classes of pointers from the flow-insensitive but field-sensitive pointer analysis are proposed. The disclosed flow-insensitive aspects of the present invention are significantly simpler and cheaper to compute alignment of pointers in term of computation time than the existing techniques, particularly for large programs. Further, the techniques implementing these types of analyses have been extended to be field-sensitive and implemented as the basis for data reorganization in future compilers.

It should be noted that, in general and as used herein, the term "optimize" may refer to and/or be defined as "maximize," "minimize," "best," or attain one or more specific targets, objectives, goals, or intentions. The term optimize may also refer to maximizing a benefit to a user, making the most effective or functional use of a situation, opportunity, or resource, or increasing efficiency of a resource or program in an empirically observable way.

Additionally, the term optimizing need not refer to a best solution or result but may refer to a solution or result that "is good enough" or simply "better" than as previous for a particular application, for example. In an additional aspect, the terms optimize and/or optimizing may refer to an operation performed in order to achieve an improved result, such as reduced execution costs or increased resource utilization, whether or not the optimum result is actually achieved. Similarly, the term optimize may refer to a component for performing such an improvement operation, and the term optimized may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
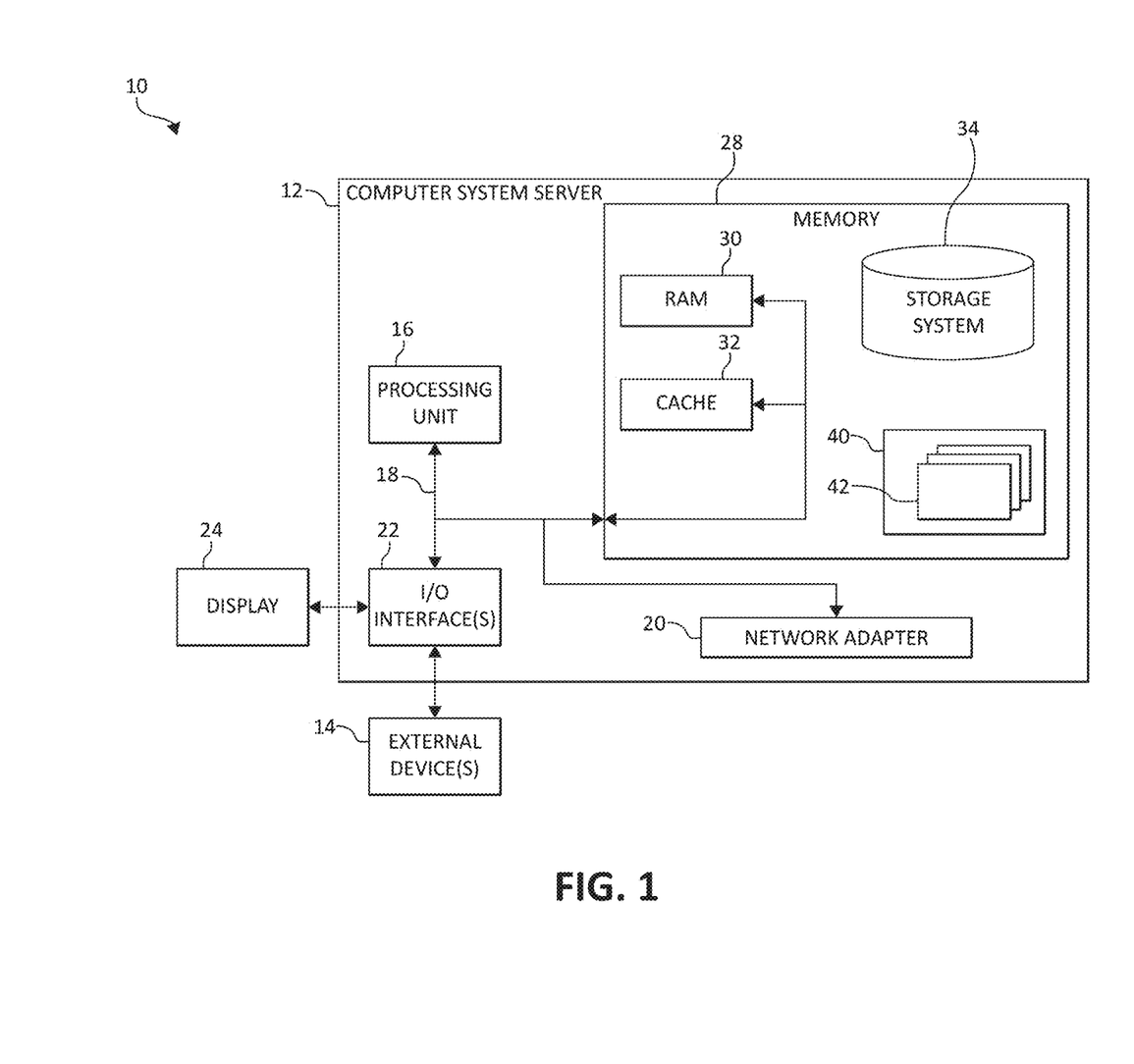
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
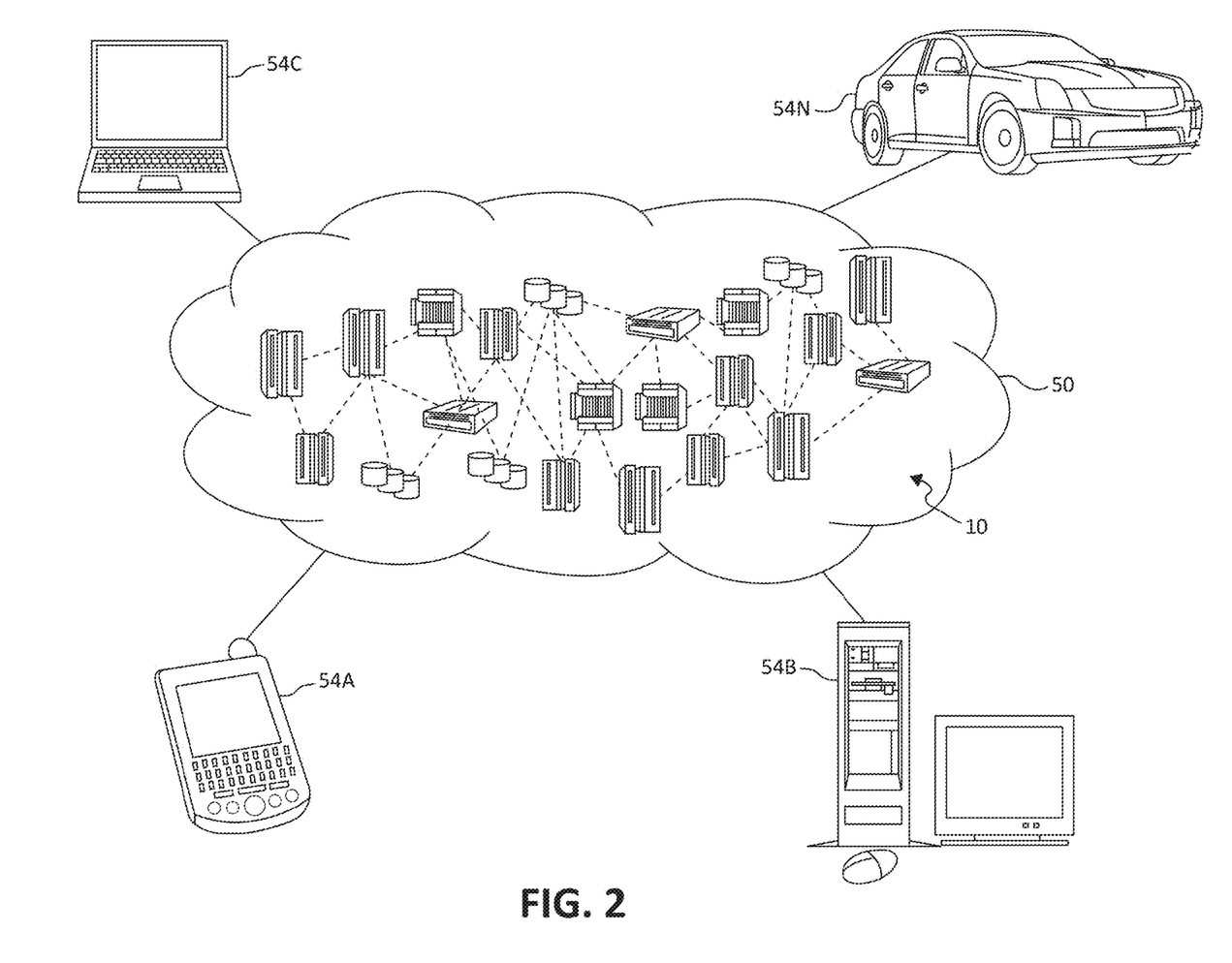
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
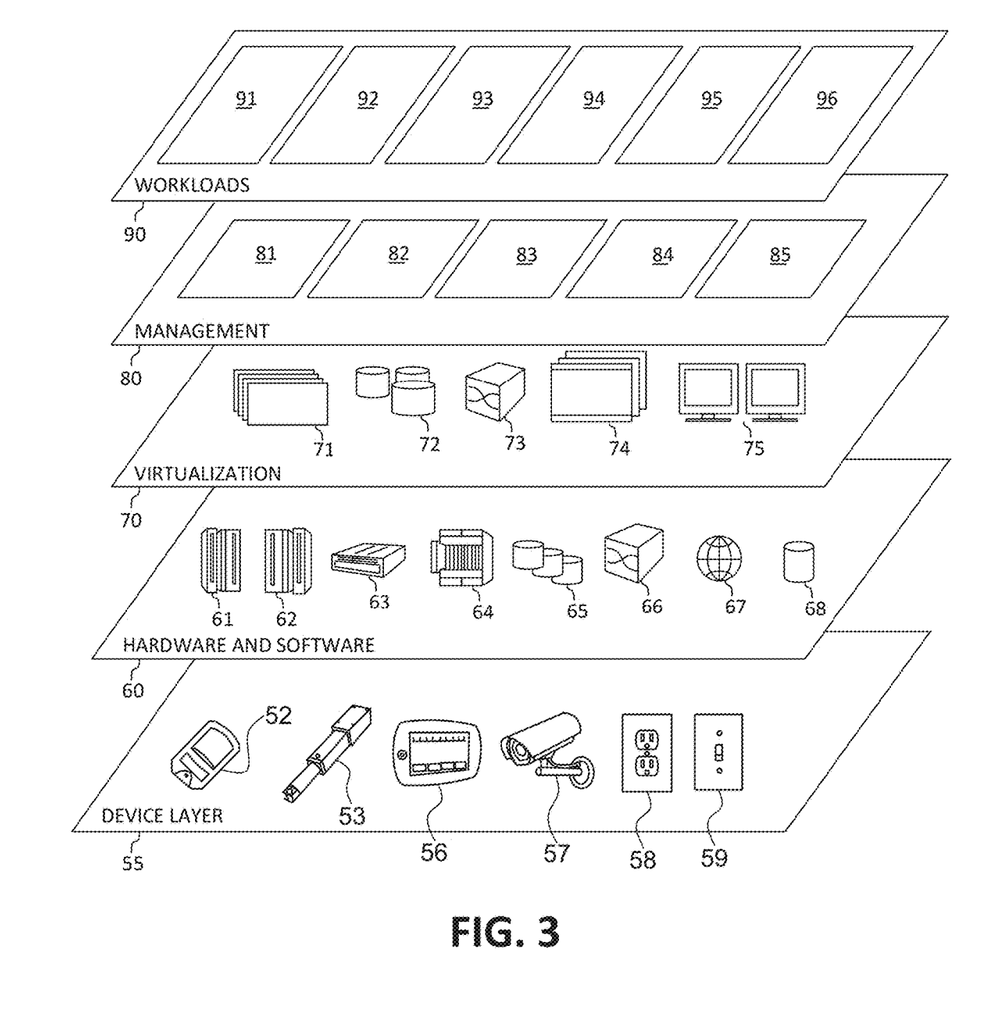
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 that promote pointer alignment in computer programming applications. In addition, workloads and functions 96 may include such operations as performing various analyses (e.g., pointer analysis/analyses) to identify data, and parameters and characteristics of the data, which is used to directly or indirectly facilitate the pointer alignment computation. One of ordinary skill in the art will appreciate that the workloads and functions 96 for computing pointer alignment in computer programming applications may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Referring now to the body of functionality achieved by aspects of the present invention, embodiments of the present invention, again, introduce novel inter-procedural compilation methods to efficiently compute the alignment of pointers in order to optimize or improve performance in the execution of the compiled program code. Embodiments of the present invention consist of aspects of performing a flow-insensitive yet field-sensitive pointer analysis and collecting the equivalence classes of pointers for the entire program. Additional aspects include identifying, from the equivalence classes of pointers, candidate pointers for which to compute the alignment based on the code pattern of their references (i.e., the candidate pointer's) in the program. Additional aspects include computing the alignment, bottom-up (i.e., flow-insensitive) for each identified candidate pointer starting from its reference point in the program. The resultant alignment information may then be provided to the compiler to enable the compiler to optimize the references of these candidate pointers for which the alignment was computed.

It should be noted that, certainly not by way of limitation, the disclosed techniques are especially efficient for relatively large programs for which alignment information is needed for only a certain number of pointers. These techniques have been prototyped and found to have obtained a ~2-4% performance rate improvement of compiled code at runtime and an ~8% code size reduction for SPEC CPU® 2017 mcf_r code, as the redundant two versions of non-8-byte alignment code for data swapping in spec_qsort were able to be all removed.

Figure 4:
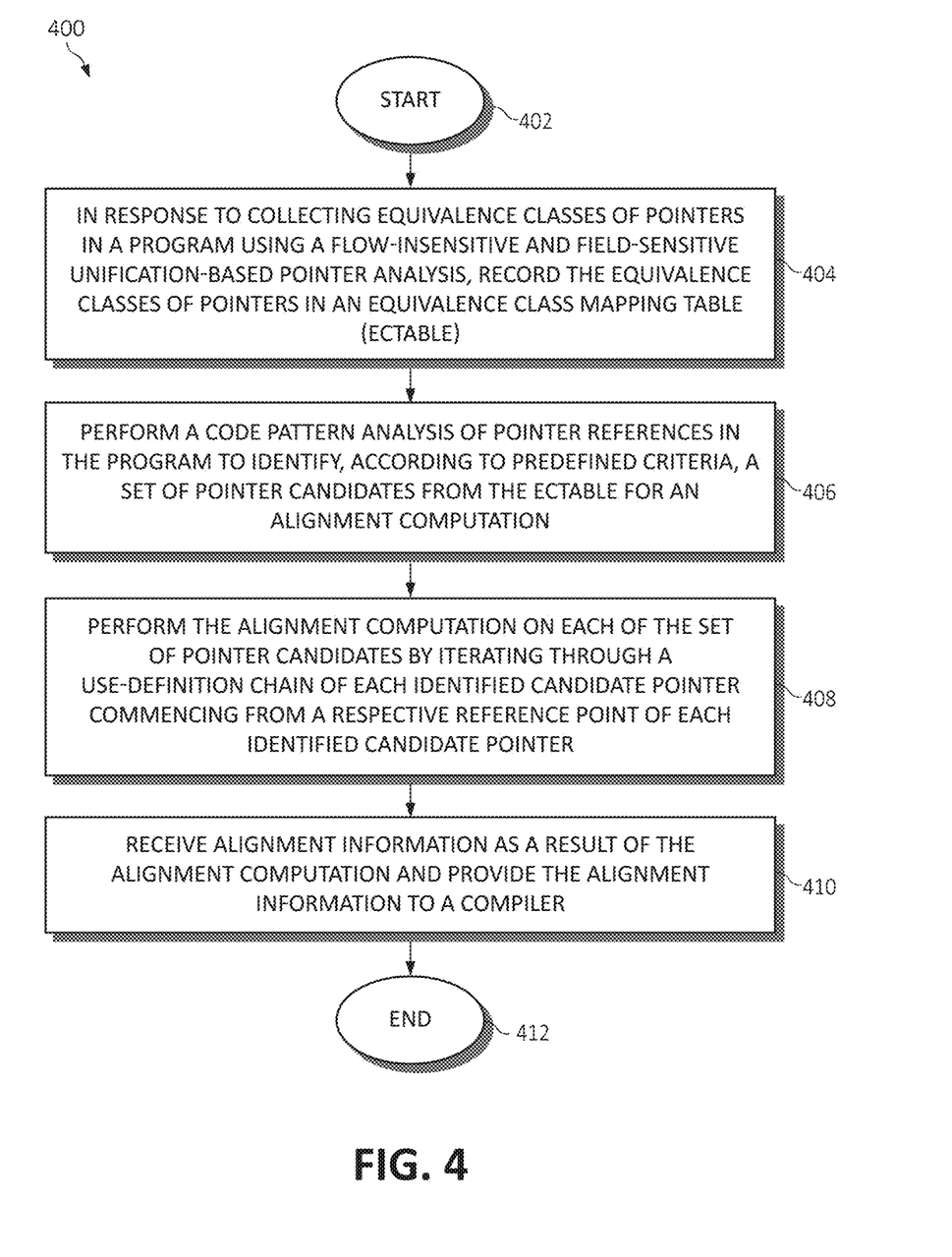
FIG. 4 is a flowchart diagram depicting a computer-implemented method for computing pointer alignment in programming, in accordance with aspects of the present invention.

Turning now to FIG. 4, a computer-implemented method 400 for computing pointer alignment in programming applications is depicted, in accordance with aspects of the present invention. The functionality of the method 400 may be executed as instructions on, for example, computer system/server 12 by processing unit 16, where the instructions are embodied on a tangible, non-transitory machine-readable storage medium, such as storage system 34. The method 400 begins at step 402. In some embodiments, at step 404 equivalence classes of pointers in a program using a flow-insensitive and field-sensitive unification-based pointer analysis, and these equivalence classes of pointers are recorded in an equivalence class mapping table (ECTable). At step 406, a code pattern analysis of pointer references in the program is performed to identify, according to predefined criteria, a set of pointer candidates from the ECTable for an alignment computation. As will be described, the code pattern analysis utilizes the predefined criteria to determine whether references to those analyzed pointers are enabled to be optimized in the code.

At step 408, the alignment computation on each of the set of pointer candidates is performed by iterating through a use-definition chain of each identified candidate pointer commencing with a respective reference point of each identified candidate pointer in the program. At step 410, alignment information is received as a result of the alignment computation, and this alignment information is provided to a compiler to optimize execution of the program. The method 400 ends at step 412.

Figure 5:
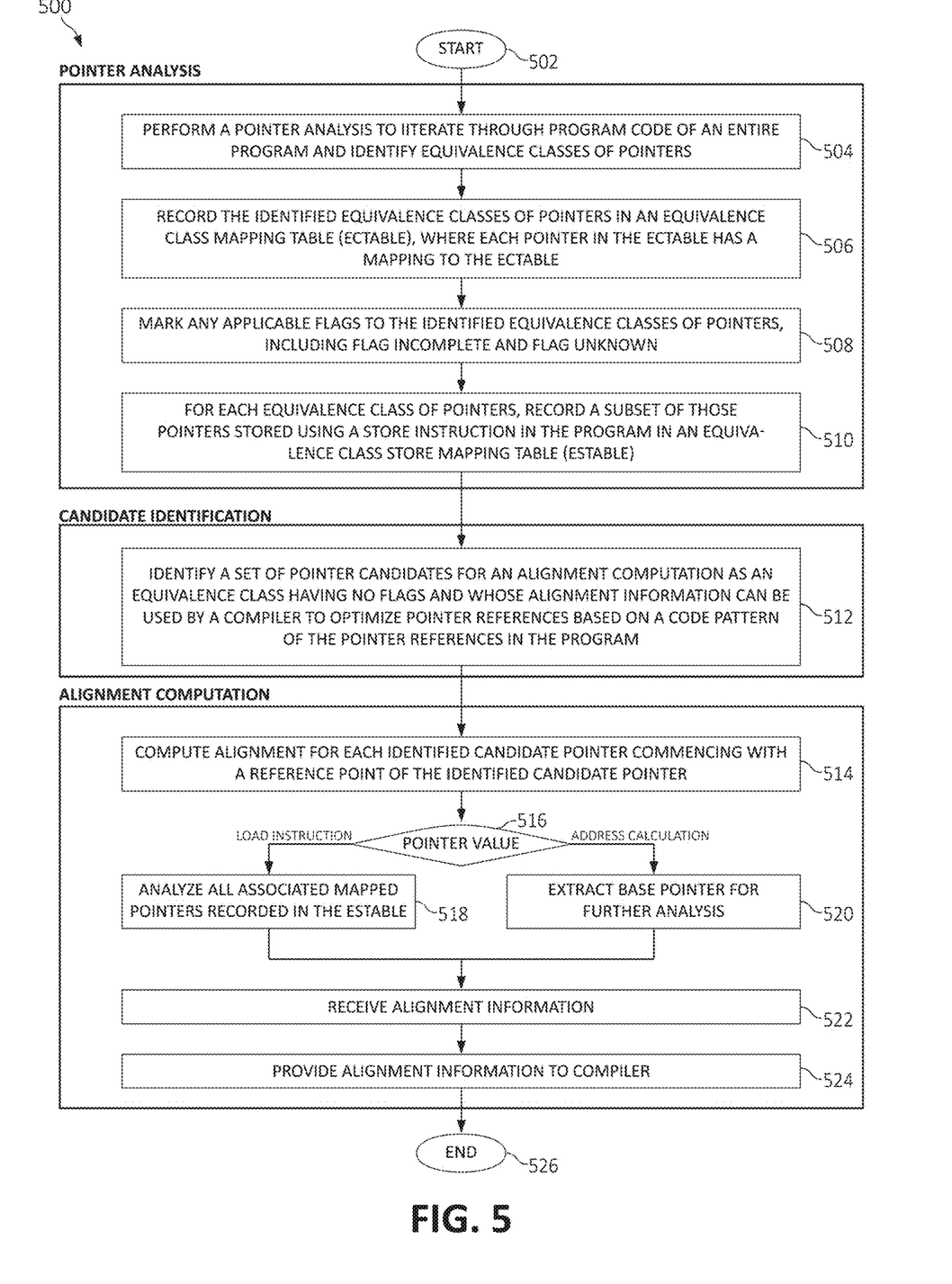
FIG. 5 is an additional flowchart diagram depicting a computer-implemented method for computing pointer alignment in programming, in accordance with aspects of the present invention.

Turning now to FIG. 5, a computer-implemented method 500 for computing pointer alignment in programming applications is depicted, in accordance with aspects of the present invention. The functionality of the method 500 may be executed as instructions on, for example, computer system/server 12 by processing unit 16, where the instructions are embodied on a tangible, non-transitory machine-readable storage medium, such as storage system 34. The method 500 begins at step 502, and can be viewed as component stages as follows.

Pointer Analysis

At step 502, a pointer analysis is performed on program code of a program to identify all equivalence classes of pointers in the program. In some embodiments, the pointer analysis may comprise a flow-insensitive, context-insensitive, but field-sensitive unification-based pointer analysis (e.g., using Steensgaard's method). In some embodiments, the pointer analysis to identify the equivalence classes of pointers may be completed by iterating through and identifying all equivalence classes of the pointers in a single pass. At step 504, all identified equivalence classes of pointers determined from the pointer analysis are recorded in an equivalence class mapping table (ECTable) stored or maintained in system memory 28, including but not limited to cache memory 32, RAM 30, and/or storage system 34. Each pointer recorded in the ECTable includes a mapping to the ECTable such that, when iterating through the program code by the pointer analysis, whenever a pointer assignment is met in the analysis, the corresponding two pointers are considered equivalent; and this equivalency is recorded in the ECTable at step 506.

When performing the pointer analysis and iterating through the program code to identify the equivalence classes of pointers, predefined flags may be marked to applicable equivalence classes of the pointers based on pointer behavior and/or characteristics of the respective pointer(s). In step 508, these applicable flags are marked for each applicable equivalence class of the pointers according to such pointer behavior and/or characteristics. In some embodiments, these flags may include, for example, flag incomplete to indicate the pointer(s) escape the program and flag unknown to indicate the pointer(s) originate from unknown allocated memory. In step 510, for each equivalence class of pointers recorded in the ECTable, a subset of those pointers whose values are stored using a store instruction in the program is additionally recorded in an equivalence store mapping table (ESTable).

Candidate Identification

Continuing with the method 500 and now referring now to step 512, a set of pointer candidates of the equivalence classes of pointers recorded in the ECTable are identified for the purpose of an alignment computation. In some embodiments, each identified pointer is considered to be a candidate if the respective pointer(s) is an equivalence class that is not marked with flags, inclusive of flag incomplete and/or flag unknown. Further, the identified pointer is considered as a candidate for the alignment computation only if the alignment of each pointer in set of candidates of the equivalence class of pointers has associated therewith alignment information that, if available, would enable the compiler to optimize references corresponding thereto. The analysis to identify the candidate pointers is based on a code pattern of the pointers' references in the program.

For example, in one aspect, the code pattern of the pointers' references may show that alignment checks in the program code may be reduced or eliminated. Consider the following code sequence:

```
if (p & 7 == 0)
    code_sequence_for_alignment_8;
else if (code & 3 == 0)
    code_sequence_for_alignment_4;
else
    code_sequence_for_non_aligment;
```

Using this exemplary sequence, if the alignment of pointer p is determined to be 8 or higher, all the branches from pointer p can be removed, and the remaining code after simplification would consist of:
code_sequence_for_alignment_8

In another example, the code pattern of the pointers' references may show that code versioning can be avoided based on the pointer's alignment. Consider the following loop: while (*p++!='s'); Here, pointer p points to a 1-byte integer. If the alignment of p is determined not to be 1, aggressive load speculation of SIMDization can be performed safely (i.e., at a reduced risk of error) for the loop without loop versioning according to the alignment check. This is because, generally, loads can be safely speculated without an alignment check if all memory accesses fall within a single page in memory can be shown. Usually, this is done through loop versioning to check if the first load is aligned with the page boundary and the total loop iteration count is less than the page size, however, using this alignment information the loop versioning can be removed. Moreover, if the information about the data alignment and size is available at compile time, then no runtime check is necessary.

In some embodiments and as aforementioned, when performing the pointer analysis, the candidate pointers for the alignment computation may be identified by iterating through all the references of those pointers that are equivalence classes which are not marked with flag either incomplete or unknown, compute the pointer's alignment and record it in the ESTable, and provide this information to the compiler's optimizers to use the recorded alignment information to optimize the program code. In some embodiments, the candidate pointers may be identified and their alignment computation requested when performing specific optimization analyses, such as branch elimination, loop versioning, and the like.

Alignment Computation

Continuing with the method 500 and now referring to step 514, an alignment computation is performed on each identified candidate pointer. It should be again noted that this alignment computation is not simply a pointer analysis (as known in the art), but using resultant candidate pointers identified through the pointer analysis to obtain memory alignment information associated therewith (i.e., alignment information of each pointer). In some embodiments, the alignment may be performed, commencing with a reference point of the identified pointer, by iterating through a use-definition chain of the pointer. When iterating through the use-definition chain of the pointer, the definition of each pointer variable is analyzed. In some embodiments, the alignment computation may be performed "bottom-up" or "backward" (i.e., flow-insensitive) through its branches starting with this reference point.

When performing the alignment computation, and now referring to step 516, a determination is made as to whether a value of the pointer is from a load instruction or an address calculation. If, at step 516, the pointer value originates from a load instruction, the method 500 moves to step 518, where all associated mapped pointers (to the pointer being currently analyzed) as recorded in the ESTable are further analyzed. If, at step 516, the pointer value is determined to have originated from an address calculation, including the pointer assignment, the pointer parameter passing from call sites, and the pointer value returned from function calls, the method 500 moves to step 520. At step 520, the base pointer of the currently analyzed pointer undergoing the alignment computation is extracted for further analysis. In conjunction with this analysis, an integer value of great common divisor (gcd) coefficients of the remaining address computation is computed and used to obtain the alignment information of the pointer up this (the current) stage of computation.

In either case (i.e., whether the pointer value is determined to be from a load instruction or an address calculation), the alignment of the candidate pointer is computed using the prescribed method. At step 522, alignment information is received subsequent to performing the alignment computation, and at step 524 this alignment information is provided to a compiler. The compiler may then use this alignment information to, as aforementioned, optimize references of the candidate pointer, simplify program code, and/or remove dynamic alignment checks, for example, such that resources that would otherwise perform these checks may be diverted for usage in other optimization techniques or for other purposes. At step 526, the method 500 ends.

Figure 6:
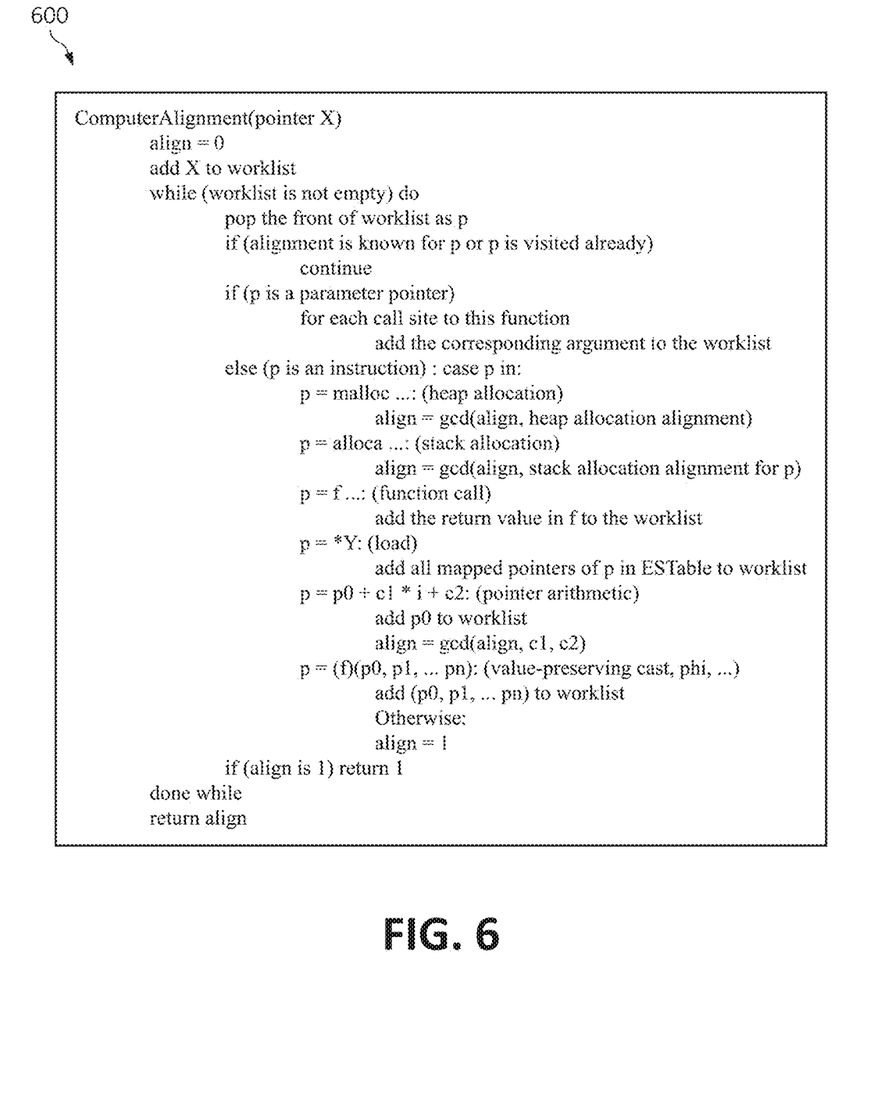
FIG. 6 depicts exemplary programming code of an algorithm for computing pointer alignment, in accordance with aspects of the present invention.

Referring now to FIG. 6, FIG. 6 depicts exemplary programming code 600 for computing pointer alignment, illustrating an implementation of the method 500 based on the LLVM compiler infrastructure intermediate representation (IR) code representation. Programming code 600 illustrates the implementation based on the LLVM IR where each pointer variable is assigned exactly once. It should be noted that, as one skilled in the art would appreciate, the exemplary programming code 600 illustrates only one of many various ways of implementing the techniques described herein, and accordingly, many variations and modifications may be made thereto without departing from the intended scope of this disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for computing pointer alignment in programming, the computer-implemented method comprising:
   in response to collecting equivalence classes of pointers in a program using a flow-insensitive and field-sensitive unification-based pointer analysis, recording the equivalence classes of pointers in an equivalence class mapping table (ECTable);
   for each of the collected equivalence classes of pointers, recording in an equivalence store mapping table (ESTable) a subset of those pointers whose values are stored using a store instruction in the program;
   performing a code pattern analysis of pointer references in the program to identify, according to predefined criteria, a set of pointer candidates from the ECTable for an alignment computation;
   performing the alignment computation on each of the set of pointer candidates by iterating through a use-definition chain of each identified candidate pointer commencing with a respective reference point of each identified candidate pointer, wherein, in response to determining a value of the identified candidate pointer is from a load instruction, all associated mapped pointers recorded in the ESTable are analyzed; and
   receiving alignment information as a result of the alignment computation and providing the alignment information to a compiler.

2. The computer-implemented method of claim 1, wherein each candidate pointer is identified as a non-flagged equivalence class mapped in the ECTable having available alignment information to enable the compiler to optimize respective pointer references of the candidate pointer.

3. The computer-implemented method of claim 2, wherein the code pattern analysis further comprises determining that the respective pointer references of the candidate pointer in the program indicate that alignment checks of the respective pointer references are enabled to be reduced or eliminated by branch elimination to simplify program code of the program.

4. The computer-implemented method of claim 2, wherein the code pattern analysis further comprises determining that the respective pointer references of the candidate pointer in the program indicate that code versioning is enabled to be reduced based on pointer alignment in which load speculation or data parallelization are performed at a reduced risk for a loop without use of loop versioning.

5. The computer-implemented method of claim 1, wherein performing the alignment computation further comprises, in response to determining the value of the identified candidate pointer is from an address calculation, extracting a base pointer of the identified candidate pointer for analysis.

6. The computer-implemented method of claim 5, wherein extracting the base pointer for analysis further comprises computing an integer value of great common divisor (GCD) for coefficients of a remaining portion of the address calculation, and obtaining alignment information up to a current stage of the address calculation according to the computation.

7. A system for computing pointer alignment in a computing environment, comprising:
a processor; and
a memory storing executable instructions that, when executed by the processor, cause the processor to:
in response to collecting equivalence classes of pointers in a program using a flow-insensitive and field-sensitive unification-based pointer analysis, record the equivalence classes of pointers in an equivalence class mapping table (ECTable);
for each of the collected equivalence classes of pointers, record in an equivalence store mapping table (ESTable) a subset of those pointers whose values are stored using a store instruction in the program;
perform a code pattern analysis of pointer references in the program to identify, according to predefined criteria, a set of pointer candidates from the ECTable for an alignment computation;
perform the alignment computation on each of the set of pointer candidates by iterating through a use-definition chain of each identified candidate pointer commencing with a respective reference point of each identified candidate pointer, wherein, in response to determining a value of the identified candidate pointer is from a load instruction, all associated mapped pointers recorded in the ESTable are analyzed; and
receive alignment information as a result of the alignment computation and provide the alignment information to a compiler.

8. The system of claim 7, wherein each candidate pointer is identified as a non-flagged equivalence class mapped in the ECTable having available alignment information to enable the compiler to optimize respective pointer references of the candidate pointer.

9. The system of claim 8, wherein the code pattern analysis further comprises determining that the respective pointer references of the candidate pointer in the program indicate that alignment checks of the respective pointer references are enabled to be reduced or eliminated by branch elimination to simplify program code of the program.

10. The system of claim 8, wherein the code pattern analysis further comprises determining that the respective pointer references of the candidate pointer in the program indicate that code versioning is enabled to be reduced based on pointer alignment in which load speculation or data parallelization are performed at a reduced risk for a loop without use of loop versioning.

11. The system of claim 7, wherein performing the alignment computation further comprises, in response to determining the value of the identified candidate pointer is from an address calculation, extracting a base pointer of the identified candidate pointer for analysis.

12. The system of claim 11, wherein extracting the base pointer for analysis further comprises computing an integer value of great common divisor (GCD) for coefficients of a remaining portion of the address calculation, and obtaining alignment information up to a current stage of the address calculation according to the computation.

13. A computer program product for computing pointer alignment in programming, the computer program product comprising:
one or more non-transitory computer readable storage media, and program instructions collectively stored on the one or more non-transitory computer readable storage media, the program instructions comprising:
program instructions to, in response to collecting equivalence classes of pointers in a program using a flow-insensitive and field-sensitive unification-based pointer analysis, record the equivalence classes of pointers in an equivalence class mapping table (ECTable);
program instructions to, for each of the collected equivalence classes of pointers, record in an equivalence store mapping table (ESTable) a subset of those pointers whose values are stored using a store instruction in the program;
program instructions to perform a code pattern analysis of pointer references in the program to identify, according to predefined criteria, a set of pointer candidates from the ECTable for an alignment computation;
program instructions to perform the alignment computation on each of the set of pointer candidates by iterating through a use-definition chain of each identified candidate pointer commencing with a respective reference point of each identified candidate pointer, wherein, in response to determining a value of the identified candidate pointer is from a load instruction, all associated mapped pointers recorded in the ESTable are analyzed; and
program instructions to receive alignment information as a result of the alignment computation and provide the alignment information to a compiler.

14. The computer program product of claim 13, wherein each candidate pointer is identified as a non-flagged equivalence class mapped in the ECTable having available alignment information to enable the compiler to optimize respective pointer references of the candidate pointer.

15. The computer program product of claim 14, wherein the code pattern analysis further comprises program instructions to determine that the respective pointer references of the candidate pointer in the program indicate that alignment checks of the respective pointer references are enabled to be reduced or eliminated by branch elimination to simplify program code of the program.

16. The computer program product of claim 14, wherein the code pattern analysis further comprises program instructions to determine that the respective pointer references of the candidate pointer in the program indicate that code versioning is enabled to be reduced based on pointer alignment in which load speculation or data parallelization are performed at a reduced risk for a loop without use of loop versioning.

17. The computer program product of claim 13, wherein performing the alignment computation further comprises program instructions to, in response to determining the value of the identified candidate pointer is from an address calculation, extract a base pointer of the identified candidate pointer for analysis.

18. The computer program product of claim 17, wherein extracting the base pointer for analysis further comprises program instructions to compute an integer value of great common divisor (GCD) for coefficients of a remaining portion of the address calculation, and obtaining alignment information up to a current stage of the address calculation according to the computation.

* * * * *